United States Patent [19]
Chow et al.

[11] Patent Number: 6,073,518
[45] Date of Patent: Jun. 13, 2000

[54] BIT MANUFACTURING METHOD

[75] Inventors: Jacob T. C. Chow; Sidney L. Findley; David P. Beacco; Lorenzo G. Lovato, all of Salt Lake City, Utah

[73] Assignee: Baker Hughes Incorporated, Houston, Tex.

[21] Appl. No.: 08/719,254

[22] Filed: Sep. 24, 1996

[51] Int. Cl.[7] .................................................. B22F 3/00
[52] U.S. Cl. ........................... 76/108.2; 419/5; 419/8; 419/9; 419/27
[58] Field of Search ............................. 76/108.1, 108.2; 419/4, 5, 47, 8, 9, 27

[56] References Cited

U.S. PATENT DOCUMENTS

| | | |
|---|---|---|
| 2,612,443 | 9/1952 | Goetzel et al. . |
| 2,843,501 | 7/1958 | Ellis et al. . |
| 3,471,921 | 10/1969 | Feenstra et al. . |
| 3,757,878 | 9/1973 | Wilder et al. . |
| 3,757,879 | 9/1973 | Wilder et al. . |
| 3,823,002 | 7/1974 | Kirby, Jr. et al. . |
| 4,398,952 | 8/1983 | Drake . |
| 4,484,644 | 11/1984 | Cook et al. . |
| 4,863,538 | 9/1989 | Deckard . |
| 4,884,477 | 12/1989 | Smith et al. . |
| 4,919,013 | 4/1990 | Smith et al. . |
| 5,000,273 | 3/1991 | Horton et al. . |
| 5,017,753 | 5/1991 | Deckard . |
| 5,090,491 | 2/1992 | Tibbitts et al. . |
| 5,101,692 | 4/1992 | Simpson . |
| 5,132,143 | 7/1992 | Deckard . |
| 5,155,321 | 10/1992 | Grube et al. . |
| 5,155,324 | 10/1992 | Deckard et al. . |
| 5,156,697 | 10/1992 | Bourell et al. . |
| 5,182,170 | 1/1993 | Marcus et al. . |

(List continued on next page.)

FOREIGN PATENT DOCUMENTS

| | | |
|---|---|---|
| 0 075 648 A1 | 9/1981 | European Pat. Off. . |
| 0 096 591 | 12/1983 | European Pat. Off. . |
| 0 145 421 | 6/1985 | European Pat. Off. . |
| 0 599 371 A1 | 6/1994 | European Pat. Off. . |
| 0 633 440 A1 | 1/1995 | European Pat. Off. . |

(List continued on next page.)

OTHER PUBLICATIONS

International Search Report, dated Jul. 22, 1998 (10 pages).
Dvorak, Paul, "Rapid Prototypes for Production Parts", *Machine Design*, pp. 48–54, Oct. 8, 1993.
Author unknown, "Models in Minutes—and At Your Desk", *Machine Design*, pp. 20 & 23, Oct. 22, 1993.
Author unknown, "Rapid Mold Maker Promise Faster Metal Prototypes", *Machine Design*, Nov. 26, 1992.
Author unknown, "Protech Engineer Applies Finishing Touch to Stereolithography", pp. 36 & 37, undated.
Protech Services, Inc. company brochure, undated.

(List continued on next page.)

*Primary Examiner*—Douglas D. Watts
*Attorney, Agent, or Firm*—Trask, Britt & Rossa

[57] ABSTRACT

A method of manufacturing a drill bit or other drilling-related structure used for drilling into subterranean formations is herein disclosed where a blank is formed by placing a ferrous metal powder such as steel into a mold, sintering the ferrous metal powder to form a preformed blank, packing an abrasion- and erosion-resistant material such as tungsten carbide powder around the preformed blank, and infiltrating the preformed blank and tungsten carbide with a common binder such as a copper-based binder. For some materials, during sintering, the preformed blank may shrink in size relative to the mold enough to provide space between the mold and the preformed blank for a layer of abrasion- and erosion-resistant material. With other materials, a separate blank mold may be used to form the sintered blank which can then be inserted into the mold for infiltration. Accordingly, the same or substantially similarly configured mold can be used to form the preformed blank and the finished drill bit or drilling-related structure having a sintered steel core and a tungsten carbide shell infiltrated with a copper-based binder.

37 Claims, 9 Drawing Sheets

U.S. PATENT DOCUMENTS

| | | |
|---|---|---|
| 5,252,264 | 10/1993 | Forderhase et al. . |
| 5,284,695 | 2/1994 | Barlow et al. . |
| 5,304,329 | 4/1994 | Dickens, Jr. et al. . |
| 5,316,580 | 5/1994 | Deckard . |
| 5,332,051 | 7/1994 | Knowlton . |
| 5,342,919 | 8/1994 | Dickens, Jr. et al. . |
| 5,352,405 | 10/1994 | Beaman et al. . |
| 5,373,907 | 12/1994 | Weaver . |
| 5,385,780 | 1/1995 | Lee . |
| 5,441,121 | 8/1995 | Tibbitts . |
| 5,453,241 | 9/1995 | Akerman et al. . |
| 5,644,956 | 7/1997 | Blackman et al. ...................... 76/108.2 |

FOREIGN PATENT DOCUMENTS

| | | |
|---|---|---|
| 0 729 823 A1 | 9/1996 | European Pat. Off. . |
| 672 257 | 2/1939 | Germany . |
| 33 47 501 A1 | 5/1985 | Germany . |
| 809133 | 2/1959 | United Kingdom . |
| 2 007 720 | 9/1977 | United Kingdom . |
| 1 572 543 | 7/1980 | United Kingdom . |
| 2 296 673 | 7/1996 | United Kingdom . |
| WO 81/03634 | 12/1981 | WIPO . |
| WO 85/02570 | 6/1985 | WIPO . |
| WO 9003893 | 4/1990 | WIPO . |
| WO 9208592 | 5/1992 | WIPO . |
| WO 95/34795 | 12/1995 | WIPO . |

OTHER PUBLICATIONS

Tait, David, Autofact '93 Conference materials entitled "Cashing in on Rapid Prototyping", Nov. 10, 1993.

Wohlers, Terry, Autofact '93 Conference materials entitled Advancements in Rapid Prototyping, Nov. 10, 1993.

News Release—from Soligen, Inc., entitled Soligen Announces DSPC™ Machine Order by Ashland Chemical, Jul. 14, 1993.

News Release—from Soligen, Inc. entitled "Soligen Demonstrates Fast Reproduction of Casting Molds is Feasible Multiple Jets Used to Greatly Increase Production Speed", Aug. 17, 1993.

News Release—from Soligen, Inc., entitled "Soligen Demonstrates Surface Finish Improvement for Casting Process", Nov. 8, 1993.

Soligen, Inc. brochure entitled "Technology Backgrounder", May 1993.

Soligen, Inc. brochure entitled "If all metal parts were this simple, there would be no need for Direct Shell Production Castings", undated.

Ashley, Steven, "CGI Casting: A New Iron in the Fire", *Mechanical Engineering*, vol. 114/No. 11, pp. 49–51, Nov. 1992.

Uziel, Yehoram, An Unconventional Approach to Producing Investment Casting, *Modern Casting*, Aug. 1993.

Prioleau, Frost, et al., "The Virtual Vision Story", *Pro E The Magazine*, vol. 1, No. 2, pp. 1–4, Fall 1993.

DTMonitor Newsletter, vol. 3, No. 2, Summer 1993.

Teague, Paul E., et al. Prototyping Expands Design's Portfolio, *Design News*, Jun. 21, 1993.

Lom–1015 brochure entitled "The Power of Lom is now within reach", undated.

Stratasys™, Inc. brochure for FDM 1000®, undated.

BIT MANUFACTURING METHOD

BACKGROUND OF THE INVENTION

1. Field of the Invention

This invention relates generally to a method of manufacturing drill bits and other drilling-related structures generally used for drilling subterranean formations and, more specifically, to a method of manufacturing a drill bit or drilling-related structure having a porous, sintered steel powder core and a powdered tungsten carbide (WC) shell commonly infiltrated with a hardenable liquid binder. In a preferred embodiment, a sintered, preformed blank is formed and placed in a mold configured as a bit or other drilling-related structure, the preformed blank being sized to provide space between the blank and the mold wall to accommodate a layer of WC powder therebetween.

2. State of the Art

A typical rotary drill bit includes a bit body secured to a steel shank having a threaded pin connection for attaching the bit body to a drill string, and a crown comprising that part of the bit fitted with cutting structures for cutting into an earth formation. Generally, if the bit is a fixed-cutter or so-called "drag" bit, the cutting structures include a series of cutting elements formed at least in part of a super-abrasive material, such as polycrystalline diamond. The bit body is generally formed of steel, or a matrix of hard particulate material such as tungsten carbide (WC) infiltrated with a binder, generally of copper alloy.

In the case of steel body bits, the bit body is typically machined from round stock to the desired shape. Internal watercourses for delivery of drilling fluid to the bit face and topographical features defined at precise locations on the bit face may be machined into the bit body using a computer-controlled, five-axis machine tool. Hard-facing for resisting abrasion during drilling is usually applied to the bit face and to other critical areas of the bit exterior, and cutting elements are secured to the bit face, generally by inserting the proximal ends of studs, on which the cutting elements are mounted, into apertures bored in the bit face. The end of the bit body opposite the face is then threaded, made up and welded to the bit shank.

In the case of a matrix-type bit body, it is conventional to employ a preformed, so-called bit "blank" of steel or other suitable material for internal reinforcement of the bit body matrix. The blank may be merely cylindrically tubular, or may be fairly complex in configuration and include protrusions corresponding to blades, wings or other features on and extending from the bit face. Other preform elements or displacements comprised of cast resin-coated sand, or in some instances tungsten carbide particles in a binder, may be employed to define internal watercourses and passages for delivery of drilling fluid to the bit face, as well as cutting element sockets, ridges, lands, nozzle displacements, junk slots and other external topographic features of the bit. The blank and other displacements are placed at appropriate locations and orientations in the mold used to cast the bit body. The blank is bonded to the matrix upon cooling of the bit body after infiltration of the tungsten carbide with the binder in a furnace, and the other displacements are removed once the matrix has cooled. The upper end of the blank is then threaded and, made up with a matingly threaded shank, and the two welded together. The cutting elements (typically diamond, and most often a synthetic polycrystalline diamond compact or PDC) may be bonded to the bit face during furnacing of the bit body if thermally stable PDC's, commonly termed TSP's (Thermally Stable Products), are employed, or may be subsequently bonded thereto, usually by brazing or mechanical affixation.

As may be readily appreciated from the foregoing description, the process of fabricating a matrix-type drill bit is a somewhat costly, complex, multi-step process requiring separate fabrication of an intermediate product (the blank) before the end product (the bit) can be cast. Moreover, the blanks and preforms employed must be individually designed and fabricated.

The mold used to cast a matrix body is typically machined from a cylindrical graphite element. For many years, bit molds were machined to a general bit profile, and the individual bit face topography defined in reverse in the mold by skilled technicians employing the aforementioned preforms and wielding dental-type drills and other fine sculpting tools. In more recent years, many details may be machined in a mold using a computer controlled, five-axis machine tool. In some cases, the mold fabrication process has been made faster and less costly by use of rubber displacements duplicating in fine detail the topography of an entire bit profile and face, which displacements are then used to cast a ceramic bit mold of appropriate interior configuration, which is then used to cast a bit.

While matrix-type bits may offer significant advantages over prior art steel body bits in terms of abrasion and erosion resistance, and while recent advances in matrix technology have markedly increased the toughness and ductility of matrix bodies, in many cases the higher cost of a matrix-type bit and the longer time to fabricate same may result in the customer choosing a cheaper steel body bit with a faster delivery time. In either case, the customer must choose between a tough but less abrasion-resistant bit and a more expensive, highly abrasion-resistant bit with reduced toughness.

Both batch and conveyor-type continuous furnaces, induction heating coils, and other heating methods known in the art may be used to supply the heat necessary for sintering to occur. It is well recognized in the art to use sintering techniques to sinter and forge mixtures of steel powder and tungsten carbide to form inserts for rock-cutting bits, such as the method disclosed in U.S. Pat. No. 4,484,644 to Cook et al. It has also been recognized in the art to replace at least a portion of the hard metal matrix material (WC) of a typical bit with a tougher, more ductile displacement material, such as iron, steel, or alloys thereof. As described in U.S. Pat. No. 5,090,491 to Tibbitts et al., it is desirable to substitute a less expensive displacement material (such as steel at about 50 cents per pound) for the more expensive hard metals like tungsten carbide (at about ten dollars per pound) to provide a finished bit with improved toughness and ductility as well as impact strength. However, this reference provides that the displacement material should preferably be a mesh size of at least 400 (approximately 0.001 inches) and also states that very fine powdered materials (i.e., less than 0.001 inches in diameter) such as iron may sinter and shrink during fabrication, it being undesirable for the powder to shrink substantially during the heating process. Likewise, in GB 1,572,543 to Holden, the use of relatively inexpensive materials to provide the metal matrix of a bit, such as iron powder bonded with a copper based alloy, is disclosed. Nowhere, however, do any of these references suggest that a powdered steel blank be sintered or otherwise preformed, then subsequently infiltrated along with a layer of tungsten carbide powder to form a bit or drilling-related structure.

It is known in the art that although hard, the strength, and more particularly the ductility, of cemented hard-carbide articles are almost always inferior to those obtained by casting or forging steel, although better properties can be obtained from carbides by special means, such as additional working and annealing. Thus, it would be advantageous to provide a method of manufacturing a bit or other drilling-related structure that is a relatively simple process and that reduces the cost of producing the structure by replacing a significant amount of the bit matrix material of a typical drilling structure with a sintered steel powder blank without sacrificing the bit's resistance to erosion and abrasion. Moreover, it would be advantageous to provide such a drilling structure that has improved toughness and impact strength over similar structures manufactured by prior art methods.

SUMMARY OF THE INVENTION

Accordingly, a manufacturing method is herein disclosed to form a preformed steel powder blank or core by a sintering process. In a preferred embodiment, a substantially porous, sintered steel powder blank or core is placed in a bit mold or mold for some other drilling related structure, the steel powder blank or core being sized and configured to provide a continuous space between the interior surface of the mold defining a bit face, or other surface to be exposed to erosion and abrasion during operation of the device, and the blank. The space, being preferably about ⅛ inch in width or depth substantially over the entire surface of the blank disposed within the mold, is filled with an abrasion- and erosion-resistant material such as tungsten carbide (WC), preferably in powdered form. The mold may be vibrated to compact the abrasion- and erosion-resistant material between the blank and the interior surface of the mold. A liquefiable binder, utilized to infiltrate and bind the porous blank and abrasion- and erosion-resistant material together, is placed on top of at least a portion of the blank, and the mold assembly, including the mold, blank, binder, and abrasion- and erosion-resistant material, is placed in a furnace or other heating device known in the art such as an induction coil. The mold assembly is heated until the binder melts and is imbibed into the blank and surrounding particulate layer of abrasion- and erosion-resistant material, bonding the blank and particulate layer into a unitary structure. The finished bit or drilling related structure, as the case may be, has nearly the toughness of a steel bit with the erosion and abrasion resistance of a tungsten carbide bit without the high cost typically associated with erosion- and abrasion-resistant bits and other drilling related structures previously known in the art.

In a preferred embodiment, in order to form the substantially porous, sintered steel powder blank of the desired size to provide a desired layer thickness of abrasion- and erosion-resistant material around the blank, the bit or drilling component mold is lined with a removable material to a thickness substantially equal to the desired layer thickness of abrasion- and erosion-resistant material. A castable material, such as castable rubber, is then poured into the mold to form a "male" part representing the finished blank. A blank "female" mold is then formed, such as by casting ceramic, around the male part, the male part then being removed. The blank female mold can thus be used to form a blank that will provide the desired space between the exterior of the bit or other drilling related structure mold and the blank. The liner may be comprised of a plastic tape having the desired thickness that is cut and adhesively attached to the interior surface of the bit mold, a wax or wax-like substance that is formed on the interior surface of the bit mold to the desired thickness, or other material known in the art that can be used to inwardly displace the dimensions of the male part in the desired amount.

Once a blank mold is formed for a particular bit or component configuration, the blank mold can be reused to produce blanks for multiple bits or components of various sizes within a desired range. For example, a blank mold for a four bladed drill bit can be used to not only produce blanks for multiple four bladed drill bits of a specific size and configuration, but can be used for other sizes of four bladed drill bits of that configuration, depending on the desired thickness of the layer of WC surrounding the blank.

In another preferred embodiment, for the manufacture of drill bits, a solid steel or other machinable displacement is inserted at least partially into the blank mold and formed as part of the blank. Accordingly, the blank is comprised of two pieces, a sintered steel powder portion and an attached steel portion. Depending on the configuration of the machinable displacement, the displacement may have threads formed therein for threadedly attaching and welding the bit to a shank, as known in the art, or may have shank-like threads formed directly therein for direct attachment of the drill bit to a drill string. Thus, a threaded pin connection for connection of the bit to a drill collar or downhole motor shaft can be formed directly into the bit without requiring the welding process typically used to attach a bit shank to the bit blank.

In yet another preferred embodiment, steel powder is placed directly in the bit or component mold and is sintered to yield a blank, the sintering causing the steel powder volume to shrink. By using relatively large mesh sizes and/or single sized mesh sizes of powder, the amount of shrinkage can be controlled (usually enhanced) to provide the desired space between the interior surface of the mold and the sintered blank. In addition or as an alternative, other materials that dissipate during sintering can be intermixed with or coated over the powdered blank material to provide the desired shrinkage relative to the mold of the sintered blank. The steel powder may also be provided with or without a bonding resin, depending on whether a pre-sintering step is used to bond the particles of steel powder together with the bonding resin. If so, after pre-sintering, the preformed blank may be removed from the mold and sintered again at a higher temperature, causing the blank to further shrink in size. The undersized sintered powder blank may then be placed into the bit mold along with a layer of hard (i.e., abrasion- and erosion-resistant) material, such as WC in powder form, packed in the space defined between the undersized blank and the mold wall. The packing of the WC material around the blank may be assisted by vibrating the mold. The completed mold assembly is then loaded into a furnace or other heating device known in the art and infiltrated with a liquid binder (typically copper or copper-based with tin and/or nickel, such as those binders commercially available from Belmont Metals, Inc. of Brooklyn, N.Y., or may comprise other metallic or non-metallic materials known in the art including silver, nickel, manganese, tin, zinc, iron, cobalt, lead, wood's metal, solders and alloys thereof) until the binder infiltrates into the sintered steel powder and surrounding powdered WC material. The resulting drill bit has a steel core for toughness and a shell or surface coating of WC for abrasion and erosion resistance. Thus, even though this embodiment of the process of the invention may include multiple sintering or furnacing steps, it eliminates the need to fabricate the entire blank from steel stock and to provide a separate blank mold for forming the blank. Preferably, the sintering process is carried out at a temperature of between about 800° C. and 950° C., with the preferred temperature being about 950° C. for a duration of approximately 30 minutes.

For the manufacture of drill bits, erosion-resistant internal plenums, waterways, and other cavities may be incorporated into the bit by pre-placing displacements coated with an erosion-resistant material such as WC in the mold prior to loading the steel powder for the sintering process.

In yet another preferred embodiment of the present invention, a drill bit is formed by first using a method of layered manufacturing to make a steel powder bit body, such as the layered manufacturing process disclosed in U.S. Pat. No. 5,433,280 to Smith, assigned to the assignee of the present invention and incorporated herein by reference. Once formed, a mold may be cast around the steel powder bit body, such as a mold formed of ceramic, sand, graphite slurry, cement, plaster, or any other suitable, castable material. For sintering, the steel powder bit body may either be removed from the ceramic mold or left therein. Because the particle of steel powder may be coated or intermixed with a laser bondable material, such as a polymer or resin, during the sintering process, the bit body will shrink in size. The shrunken sintered bit body can then be surrounded by a layer of WC powder packed into the space between the shrunken bit body and the interior surface of the mold. A binder material may then be placed on top of the blank and WC powder and the mold assembly furnace infiltrated with a metal binder to produce a finished drill bit.

In a similar preferred embodiment, a hollow shell primarily comprised of WC may be layer manufactured according to the Smith patent. The shell could then be filled with steel powder and any required internal displacements and infiltrated with a binder. If desired, prior to infiltration, a mold, as previously discussed, may be formed around the shell, or the shell coated with a material non-wettable by the infiltrant.

Although the methods of manufacturing a drill bit according to the present invention have been described in relation to the aforementioned preferred methods, it is believed that a major advantage of the invention herein disclosed is that a drill bit or other drilling-related structure having a steel core and an abrasion-resistant outer shell can be manufactured without the need for machining a steel blank, or providing a separate blank mold, although a separate blank mold may be employed if blank shrinkage does not provide adequate clearance for the abrasion-resistant shell layer. Moreover, the present invention produces a drill bit or drilling-related structure that is of somewhat lighter weight and of much lower cost than prior matrix-type bits having enhanced ductility and toughness properties compared to comparable prior art bits and bit components produced by conventional manufacturing methods.

BRIEF DESCRIPTION OF THE DRAWINGS

The features and advantages of the present invention can be more readily understood with reference to the following detailed description of the preferred embodiments, taken in conjunction with the accompanying drawings wherein.

DETAILED DESCRIPTION OF THE PREFERRED EMBODIMENTS

Figure 1A:
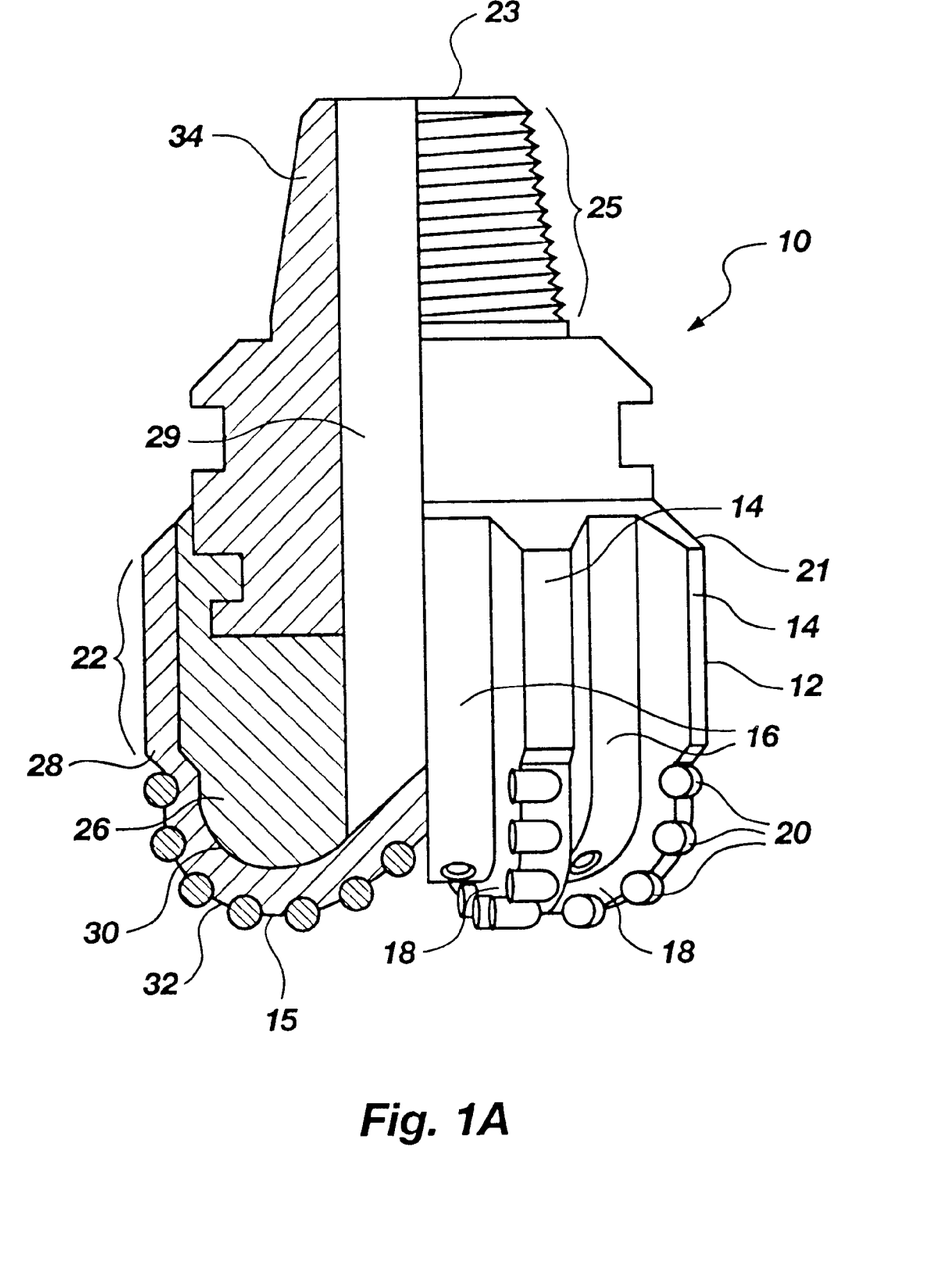
FIG. 1A is a partially cross-sectioned schematic view of a first embodiment of a drill bit manufactured in accordance with the present invention.

A drill bit 10 manufactured in accordance with the present invention is illustrated in FIG. 1A. The drill bit 10 has a typical rotary drag bit configuration and is generally comprised of a bit body 12 including a plurality of longitudinally extending blades 14 defining junk slots 16 between the blades 14. Each blade 14 defines a leading or cutting face 18 that extends from proximate the center of the bit face around the distal end 15 of the drill bit 10, and includes a plurality of cutting elements 20 oriented to cut into a subterranean formation upon rotation of the drill bit 10. The cutting elements 20 are secured to and supported by the blades 14. Between the uppermost of the cutting elements 20 and the top edge 21 of the blade 14, each blade 14 defines a longitudinally and radially extending gage portion 22 that corresponds to approximately the largest-diameter-portion of the drill bit 10 and thus is typically only slightly smaller than the diameter of the hole to be drilled by cutting elements 20 of the bit 10. The proximal end 23 of the bit 10 includes a threaded portion or pin 25 to threadedly attach the drill bit 10 to a drill collar or downhole motor, as is known in the art. Preferably, the threaded pin portion 25 may be machined directly into the proximal end 23 of the combination shank and blank 34, hereinafter referred to as a "shablank," that is attached and formed into the body 12 of the drill bit 10.

Figure 1B:
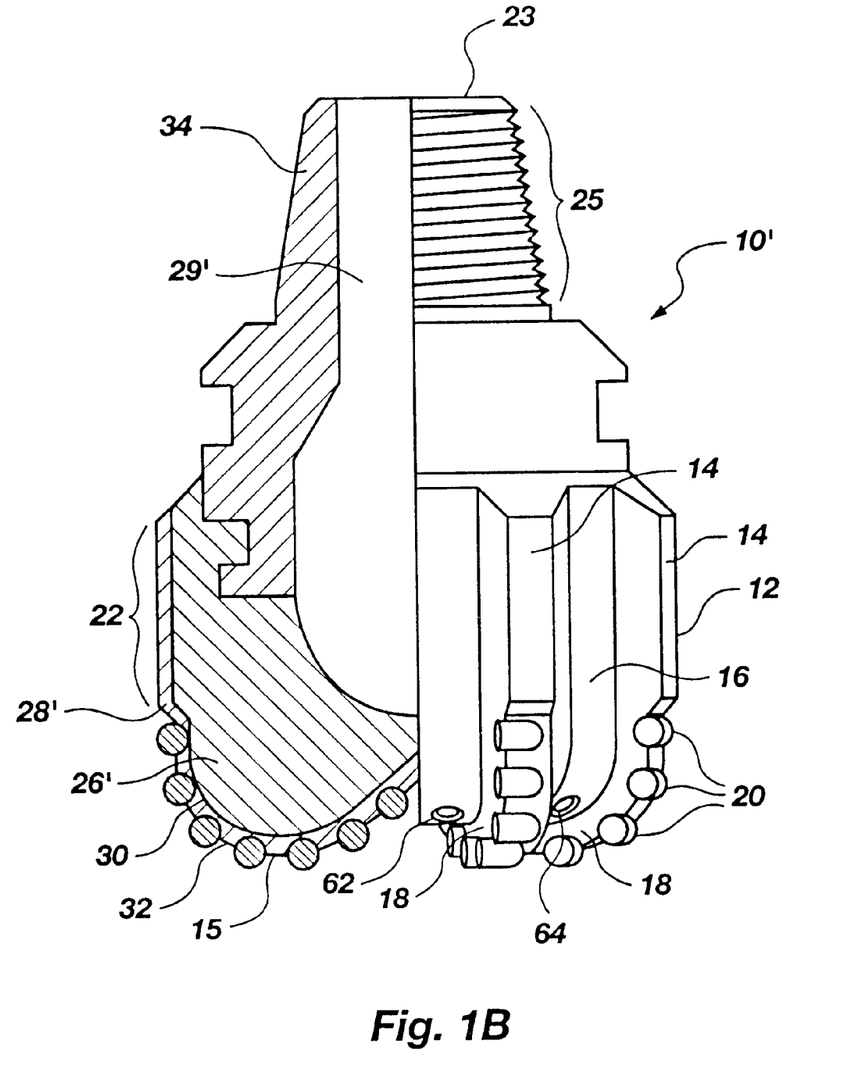
FIG. 1B is a partially cross-sectioned schematic view of a second embodiment of a drill bit manufactured in accordance with the present invention.

As further illustrated by the cut-away portion of FIG. 1A, the bit 10 is further comprised of a porous sintered blank or core 26 comprised of steel or other metal interlocked with the shablank 34 and a porous shell or layer of abrasion-resistant material 28, such as tungsten carbide (WC), infiltrated with a common liquified binder which subsequently hardens. In addition, the plenum 29 longitudinally extends from the proximal end 23 to the distal end 15, substantially through the shablank 34 and core 26, terminating at shell 28. As illustrated in FIG. 1B, the core 26' may have a topographical exterior surface configuration 30 substantially similar to the topography 32 of a completed bit 10', but smaller in size, or be different such that the shell 28 occupies a larger volume of the bit 10 (see FIG. 1A). Thus, except for the detailed topography of and surrounding the cutting elements 20, the core 26' generally may follow the contour of the drill bit 10' defined by its surface topography 32. This similarity in shape between the core 26' and the topography 32 is a result of a preferred bit manufacturing method of the present invention. Moreover, the plenum 29' may only extend partially through the core 26' such that any waterways connecting the plenum 29' to the nozzle ports 62 and 64 must extend through material of both the core 26' and shell 28'.

Figure 2A:
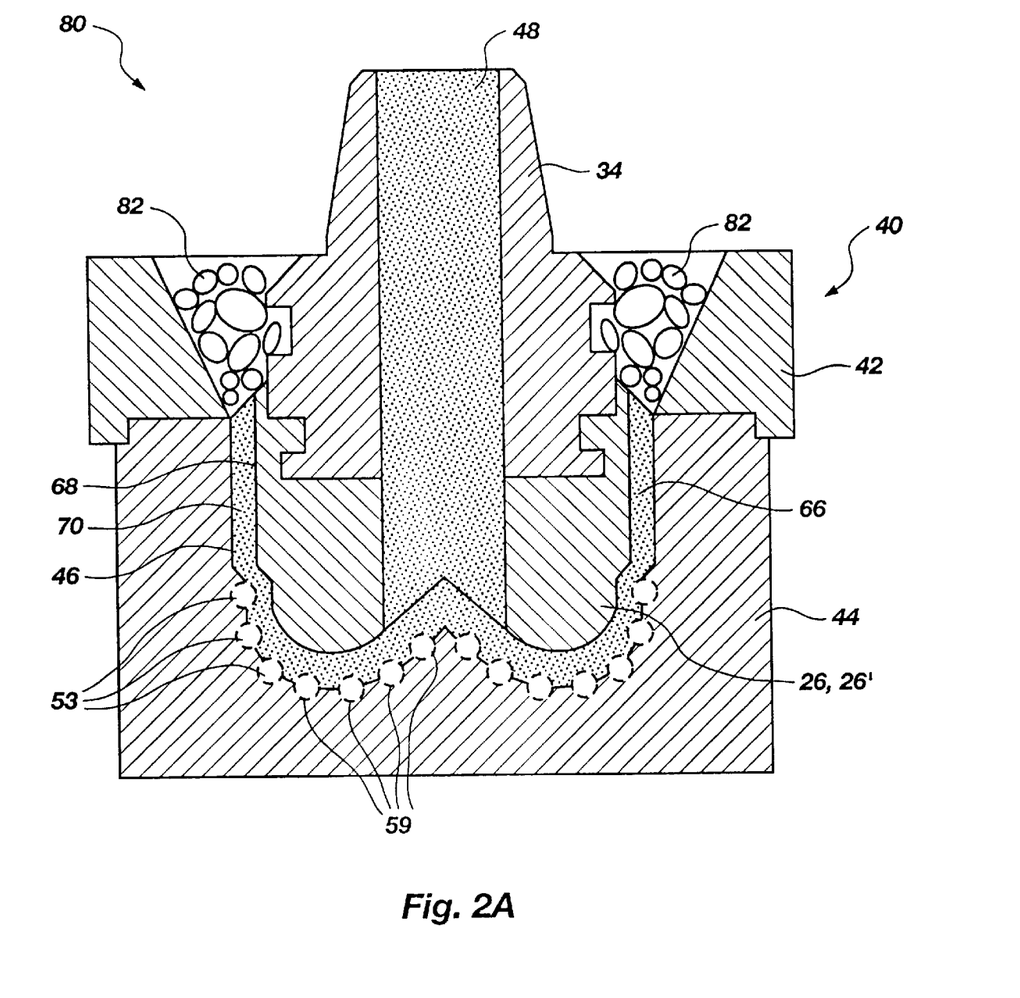
FIG. 2A is a cross-sectional view of a first embodiment of a bit mold containing the drill bit of FIG. 1A in accordance with the present invention.

As illustrated in FIG. 2A, a bit mold 40 includes an upper portion 42 and a lower portion 44. The lower portion 44 has an interior surface 46 to define the topography 32 (see FIG. 1A) of a bit 10 manufactured therein. The mold 40 is typically machined from a cylindrical graphite element or formed from other heat resistant material able to withstand the high temperatures of the bit forming process of the present invention.

Figure 2B:
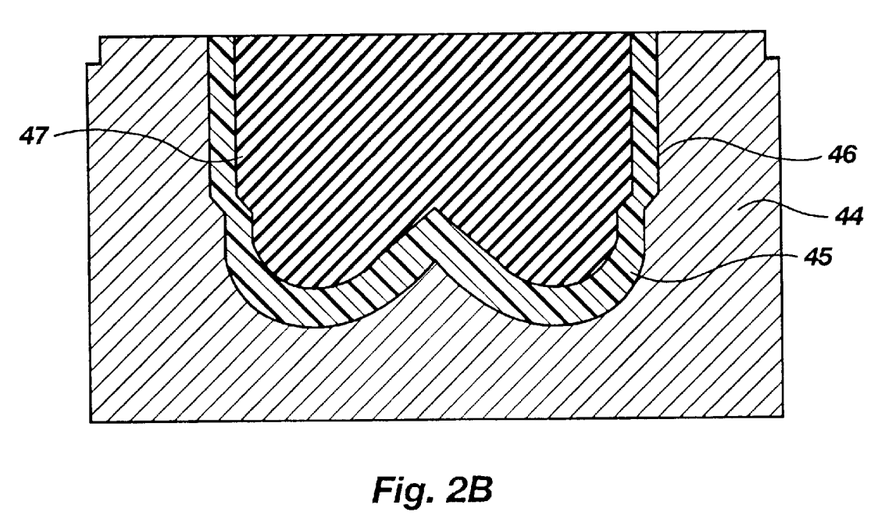
FIG. 2B is a cross-sectional view of the lower portion of the bit mold illustrated in FIG. 2A.
Figure 2C:
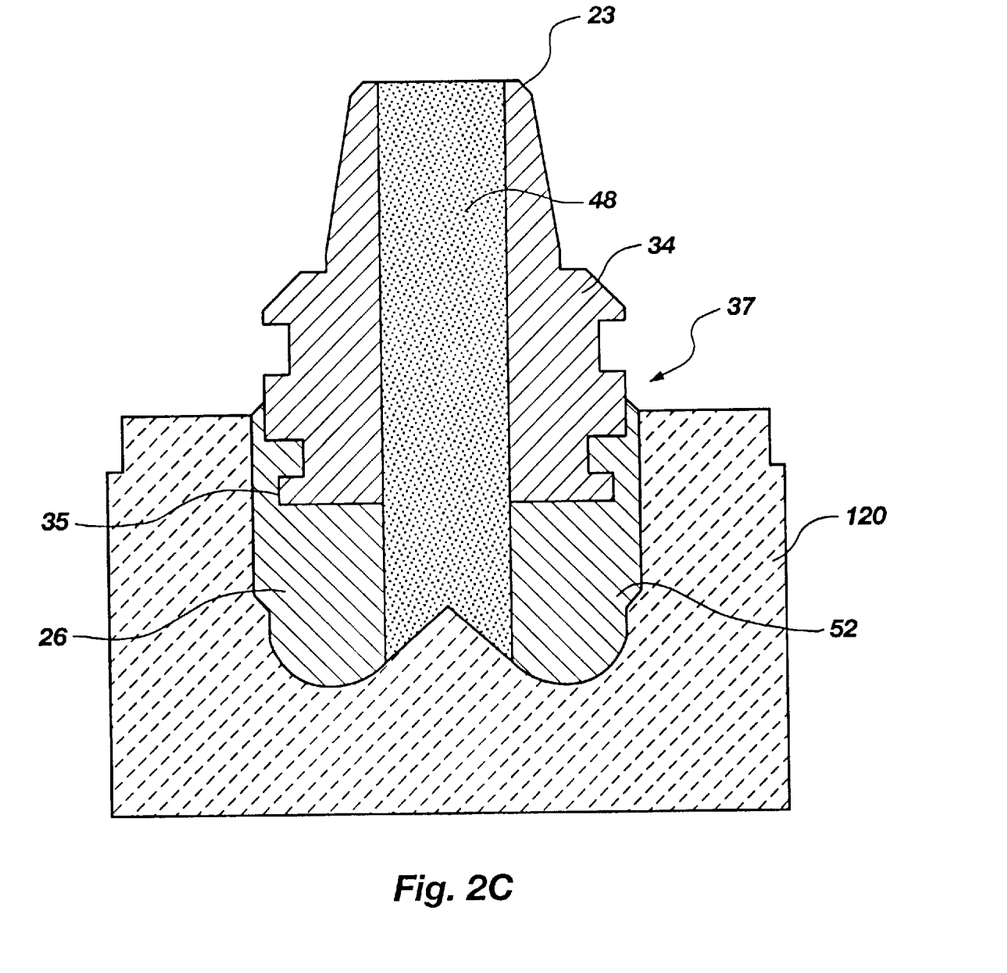
FIG. 2C is a cross-sectional view of a blank mold manufactured in accordance with the present invention.

A preferred method of manufacturing a bit 10 according to the present invention is illustrated in FIGS. 2A, 2B and 2C and comprises lining the interior surface 46 of the bit mold 40 with a liner material 45 (see FIG. 2B), such as a plastic tape, wax or wax-like substance, or other suitable material known in the art, to a thickness substantially equal to the desired thickness of the layer of WC 28.

A male part 47, comprised of castable rubber or other castable materials known in the art representing the size and configuration of the core 26, is then cast in the liner 45. The male part 47 is then used to form the blank mold 120 illustrated in FIG. 2C, which may be formed out of a castable material capable of withstanding the temperature of the sintering process, such as castable ceramic, a castable graphite slurry, or other materials known in the art. As further illustrated in FIG. 2C, steel powder 52 along with any displacements, such as sand displacement 48, are positioned to define a chamber or plenum and, if necessary, any communicating fluid passages through the finished drill bit 10 so that drilling fluid supplied from the drill string may exit proximate the cutting face 18 of the drill bit 10 during drilling. In addition, the shablank 34, formed from a machinable material, preferably steel, is positioned within the mold 120. The shablank 34 includes a flange or protrusion 35 to interlock with the core 26 and will be later formed into a threaded pin portion 25 at its proximal end 23. If desired, displacements such as displacements 53 (see FIG. 2A) defining recesses, sockets or pockets for attachment of cutting elements 20, may be positioned within the mold 120 as well. Such displacements may be desirable where the thickness of the layer of abrasion-resistant powdered material (WC) 66 in the mold 40 may not be thick enough to provide for proper by seating a cutting element 20 in the finished bit 10. Typically, the various displacements are comprised of sand with displacements for various waterways coated with tungsten carbide powder or other abrasive-resistant material held on the surface of the sand displacements by a binding material such as a wax-like substance (long-chain alcohol), a flexible polymeric binder, an adhesive, or other suitable material known in the art that can hold the tungsten carbide powder. Other displacements may comprise graphite, ceramics, clay and other suitable materials known in the art. After all displacements, such as displacement 48, are in position, the mold is filled with steel powder 52. The steel powder 52 may include Hoeganaes Ancormet 101, comprised mostly of iron with 0.19% C or 4600V, a steel powder (which has a lower melting point than 101) containing 1.86% Ni, 0.53% Mo, 0.17% Mn, 0.11% Cu, and trace amounts of Cr, C, S, Si and P. The steel powder 52 may be further packed around the displacement 48 and shablank 34 by vibrating the mold 120, for example, to eliminate any substantial voids between the particles of the steel powder 52. After the steel powder 52 is sufficiently packed in the mold 120, the mold 120 is placed in a furnace, an induction coil heater, such as that disclosed in U.S. Pat. No. 5,441,121 to Tibbitts and assigned to the assignee of the present invention, or heated by other means known in the art, and the steel powder 52 is sintered to form the finished core 26 and interlocking shablank 34.

Once sintered, the sintered blank 37, including the shablank 34 and core 26, can be removed from the mold 120 along with the displacement 48 and placed into the bit mold 40 that has had the liner 45 removed therefrom. As illustrated in FIG. 2A, WC 66 is packed around the core 26 and binder 82, usually in pellet form, is placed in the upper portion 42 of the mold 40. The upper and lower portions 42 and 44, respectively, of the mold 40 may be clamped together during the bit infiltration process. It is also contemplated that more than one sintering step may be utilized to first pre-sinter the steel powder 52 until the steel particles have enough cohesiveness to retain the shape imposed by the mold 120, thus allowing the presintered core 26 to be removed from the mold 120 and inserted along with the surrounding layer of WC 66 into the mold 40, the remainder of the sintering process occurring in the mold 40 before and/or during infiltration.

In another method, (i.e., to form the bit 10' illustrated in FIG. 1B) the steel powder 52 may be sintered directly in the mold 40 without forming a separate blank mold 120. Because of the cohesiveness of the bonded steel powder particles after sintering, the mass of steel powder 52 can be removed from the mold 40 and worked as desired to remove steel particles from the bit core 26' by rubbing, scraping, grinding, or other simple mechanical methods known in the art. Because commercially available steel powders 52 typically shrink in size about one percent during the sintering process, which may not provide for a thick enough layer of abrasion- and erosion-resistant shell 28', the preferred method has included forming a separate blank mold 120 that forms a core 26 small enough to provide adequate clearance for a desired layer thickness of abrasion- and erosion-resistant material 66 around the core 26. It is contemplated, however, that by using larger mesh sizes of particles to enhance intra-particle void areas, using steel powders having particles that are of a uniform mesh size, coating or intermixing the particles of steel powder 52 with a material, such as a polymer or resin, that will substantially dissipate during sintering, and/or increasing the temperature of the sintering process may provide enough shrinkage of the core 26' to allow for the desired layer thickness of WC 66 between the interior surface 46 of the mold 40 and the core 26'. In larger bit sizes, "normal" (one percent) shrinkage of the blank may produce adequate clearance for the WC 66. Thus, it is desirable to select a steel powder of suitable mesh size and/or composition and operate final sintering at a temperature that will result in a core 26' that shrinks a desired amount relative to the interior surface 46 of the lower portion 44 of the mold 40. It should be noted that if higher temperatures are used to cause shrinkage of the core 26', care should be taken to ensure that enough connected or communicating voids or porosity remains between the particles of sintered steel powder 52 to allow substantially complete infiltration of a binder from the exterior of the blank to the interior. Typically, it is desirable to shrink the core 26' at least about ¼ inch in diameter to provide a sufficient space or annulus between the core 26' and the interior surface 46 of the lower portion 44 of the mold 40 to accommodate about a ⅛ inch thick surrounding exterior hard face layer of WC 28'. Accordingly, the steel powder 52 will retain the overall shape originally imposed by the lower portion 44 of the mold 40, but will shrink in size as the particles of steel powder 52 bond together.

After sintering, the shrunken core 26' may be removed from the bit mold 40 for insertion of additional displacements, such as those to form nozzle orifices 62 and 64 for providing internal passages and displacements 53 for providing recesses (pockets, sockets) in the abrasion-resistant layer 28' for cutting elements. Dashed lines 59 represent thermally stable polycrystalline diamond (TSP) cutting elements that may be positioned within the mold 40 during the infiltration process, or displacements used during sintering of the steel powder blank to provide clearance for later insertion of non-thermally stable cutting elements, such as conventional polycrystalline diamond compact (PDC) elements. In addition, after sintering, the core 26' may be removed from the mold 40 and shaped to remove any out-of-tolerance portions, such as those formed adjacent the junction of the upper and lower portions 42 and 44, respectively, of the bit mold 40. Because of the relatively low strength of the bonds between particles of steel powder 52, the sintered core 26' may be relatively easily worked to remove steel particles from the core 26' by rubbing, scraping, grinding, or other simple mechanical methods known in the art. As illustrated in FIG. 2A, after reinsertion of core 26' into mold 40, the space 70 formed between the interior surface 46 of the lower portion 44 of the mold 40 and the exterior surface 68 of the core 26' is filled with an abrasion-resistant powdered material 66, such WC, which may include nickel and/or iron therein, or other WC materials known in the art, such as a WC/steel mixture. The WC may be intermixed with flux to aid the infiltration process as is also known in the art. This WC material 66 is preferably packed by vibration, or other means known in the art, into the space 70 to ensure that no substantial voids are present in the abrasion-resistant layer or shell 28' of the finished bit 10'. The shablank 34 (if not pre-positioned during sintering) is positioned at least partially within the core 26', so that after infiltration a threaded pin connection can be formed directly into the shablank 34 for attachment of the bit 10' to a drill string, thus eliminating the need for a separate shank as is known in the art.

In any of the preferred methods herein described, once the mold assembly 80 is prepared and ready for infiltration, a binder material 82 usually in pellet form, such as a copper or copper-based binder including tin and/or nickel, including infiltrants commercially available from Belmont Metals, Inc. of Brooklyn, N.Y., or may comprise other metallic or non-metallic materials known in the art including silver, nickel, tin, zinc, iron, cobalt, lead, wood's metal, solders and alloys thereof, is placed in the top of core 26. Typically, the mold assembly 80 will be heated to approximately 1180° C., at which temperature melting and infiltration of the binder 82 will occur. Because of this elevated temperature, some additional sintering of the core 26 may occur. During infiltration, the binder 82 melts and is gravity- and capillary-fed through the core 26 and into the abrasion-resistant WC material 66. The binder 82, when cooled and hardened, thus effectively binds the particles of the sintered steel core 26 and the abrasion-resistant WC material 66 together as well as the core 26 to the shablank 34. In addition, the binder 82 fills microscopic voids and vugs present between the particles of powdered metals used in this method of manufacturing.

To help promote complete infiltration and produce fewer pores within the bit material, a slight vacuum may be drawn on the mold assembly 80 to eliminate air pockets and draw the binder through the core 26 or 26' and abrasion-resistant material 66. However, even if some porosity is present in the finished drill bit 10, the material comprising the drill bit 10 is substantially tougher than drill bits manufactured using conventional powder metallurgy bit manufacturing techniques.

After infiltration, the drill bit 10 may be removed from the mold 40, the sand or other displacements removed by methods known in the art, and PDC cutting elements 20 attached to the cutting face 18 mechanically or by bonding, brazing, or other methods known in the art.

Preferably, all sintering is performed in a substantially oxygen-free environment either by imposing a vacuum or providing a gaseous environment that will displace oxygen, such as hydrogen, nitrogen, argon, or other suitable gas. A hydrogen environment is especially desirable because hydrogen atoms actively seek and scavenge oxygen atoms. Such substantially oxygen-free environments during sintering are desirable because oxidation, that would otherwise occur, may weaken the sintered structure.

Figure 3A:
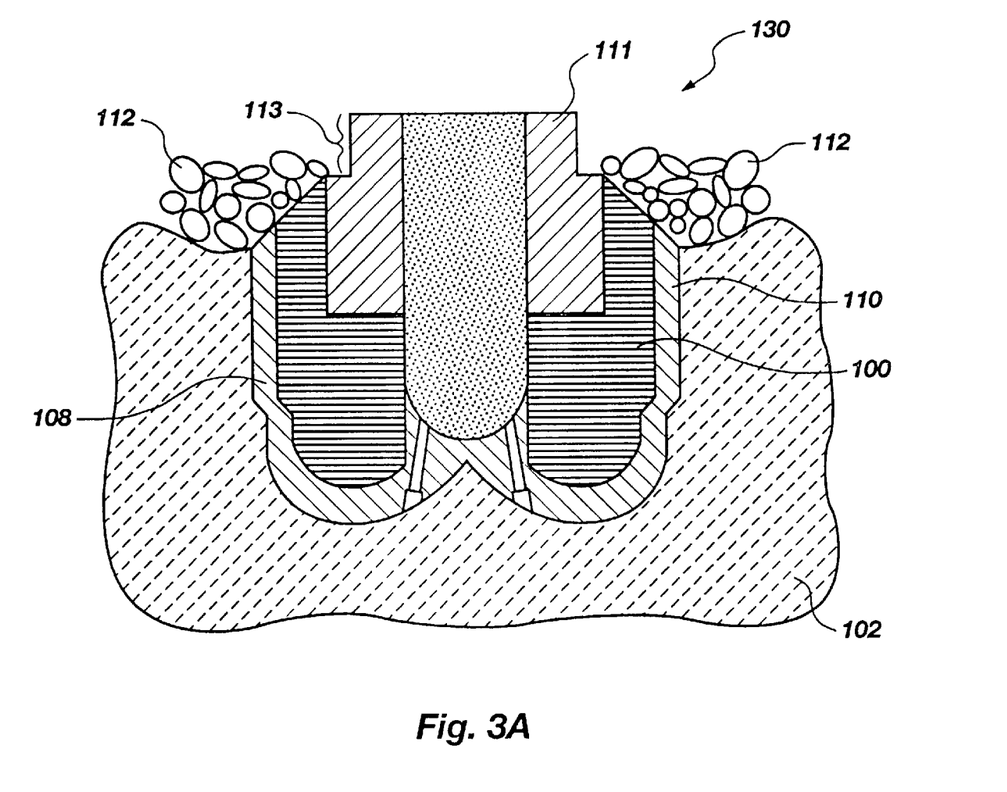
FIG. 3A is a cross-sectional view of a second embodiment of a bit mold containing a third embodiment of a drill bit manufactured in accordance with the present invention.
Figure 3B:
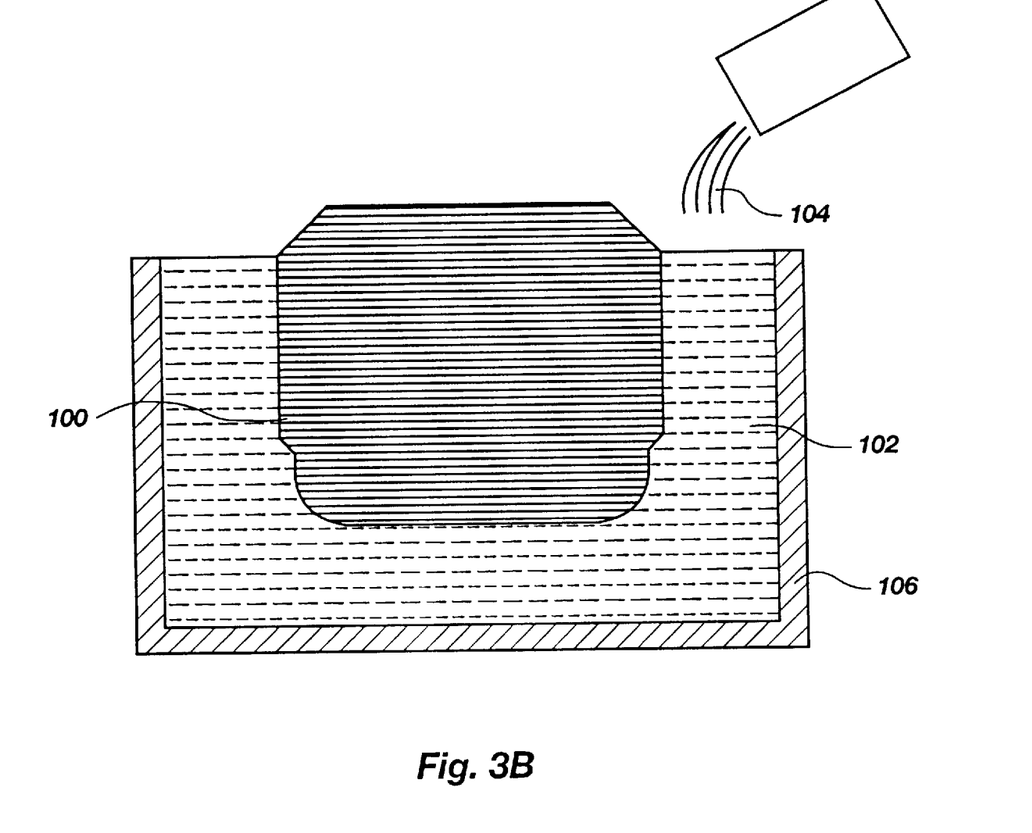
FIG. 3B is a cross-sectional view of the bit mold illustrated in FIG. 3A.

Referring now to FIG. 3A, another preferred method of manufacturing a drill bit 130 according to the present invention is illustrated. A drill bit 130 is formed by first using a method of layered manufacturing to make a steel powder core 100, such as the layered-manufacturing process disclosed in previously referenced U.S. Pat. No. 5,433,280 to Smith. Such a layered-manufacturing process may employ a laser or other beam-like energy source to heat, layer-by-layer, steel particles intermixed or coated with a laser-reactive bonding agent, such as a polymer, to melt the bonding agent and fuse the steel particles together to form the core 100. Once the core 100 is formed, a mold 102 of ceramic or other suitable materials known in the art may be cast or otherwise formed around it. As illustrated in FIG. 3B, a ceramic mold 102 may be formed by pouring a hardenable liquid 104, such as ceramic, into casing 106 around the core 100 and permitted to harden into a solid mold 102 that is resistant to temperatures substantially above that at which a binder liquifies. The steel powder core 100 may then be removed from the solidified mold 102 and sintered, or sintered within the mold 102. During the sintering process, the bonding agent in the combination steel and laser-reactive bonding agent core 100 will dissipate and/or vaporize. This dissipation will cause the core 100 to shrink in size. As illustrated in FIG. 3A, with the sintered core 100 in place, the mold 102 is subsequently packed with WC powder 108, as by vibration or other methods known in the art, into the space 110 between the shrunken core 100 and the solid mold 102. A more conventional blank insert 111, comprised of a machinable material such as steel and having a substantially cylindrical portion 113 for machining of threads therein for later attachment to a shank as is known in the art, may be inserted into the core 100. A binder 112 in pellet form is placed above the blank 100, and the mold 102 is placed in a furnace or other heating device and heated until the binder 112 melts and infiltrates the core 100 and WC powder 108, and binds the core 100 to the insert 111 to produce a finished drill bit 130.

Figure 3C:
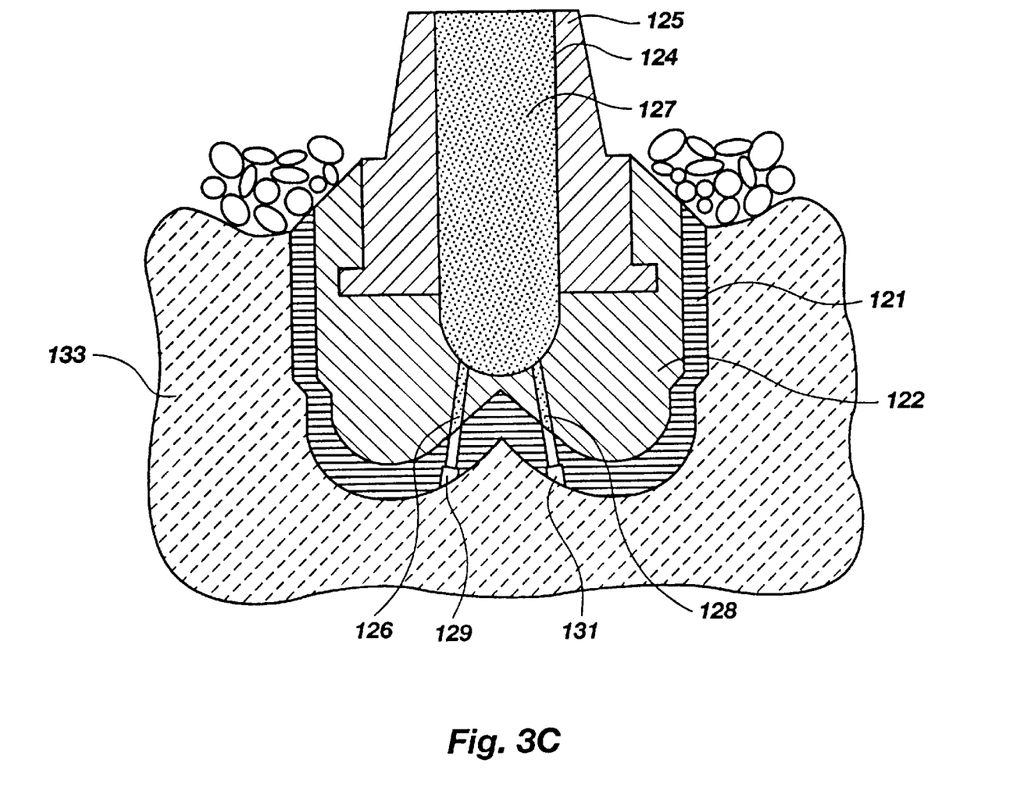
FIG. 3C is a cross-sectional view of the bit mold illustrated in FIG. 3A containing a fourth embodiment of a drill bit manufactured in accordance with the present invention.

It is also contemplated, as illustrated in FIG. 3C, that a hollow shell 120 of WC may be first formed by a layered-manufacturing method, a pre-sintered steel powder blank 122, including shablank 125, being inserted therein. The blank 122 defines passageways 124, 126 and 128 providing internal waterways from the plenum 127 to nozzle ports 129 and 131 formed in the shell 121. The assembly is then infiltrated. If desired, a mold 133 could be formed around the shell 121 of WC, or the shell exterior coated with a high-temperature resistant material non-wettable by the binder.

The drill bit 10 manufactured according to the present invention, comprised of a porous steel core 26 and layer of abrasion-resistant WC shell 28, has a much tougher structure than a similarly configured drill bit comprised of WC matrix infiltrated with binder, as is typical for prior art bit construction. In tests performed by the inventors, the impact strength of a specimen made of steel powder infiltrated with a common binder had an impact strength, measured in foot-pounds (ft-lbs), as much as seven times greater than a specimen of WC, iron and nickel infiltrated with the same binder, and twenty-three times greater than a specimen of a standard bit matrix comprised of WC and nickel infiltrated with the binder. In further testing to determine the transverse rupture strength (TRS) or resistance to shear stresses, measured in thousand pounds per square inch (ksi), a specimen of steel powder infiltrated with a common binder had more than one and a half times greater TRS than a specimen of WC powder infiltrated with binder. These test results not only show that a drill bit manufactured according to the present invention is stronger than bits in the prior art, but that because of its toughness and resistance to shear, can be manufactured to include more aggressive or radical designs (bigger or thinner blades, etc.) without causing the bit or portions thereof to fail under stresses encountered during drilling.

Figure 4:
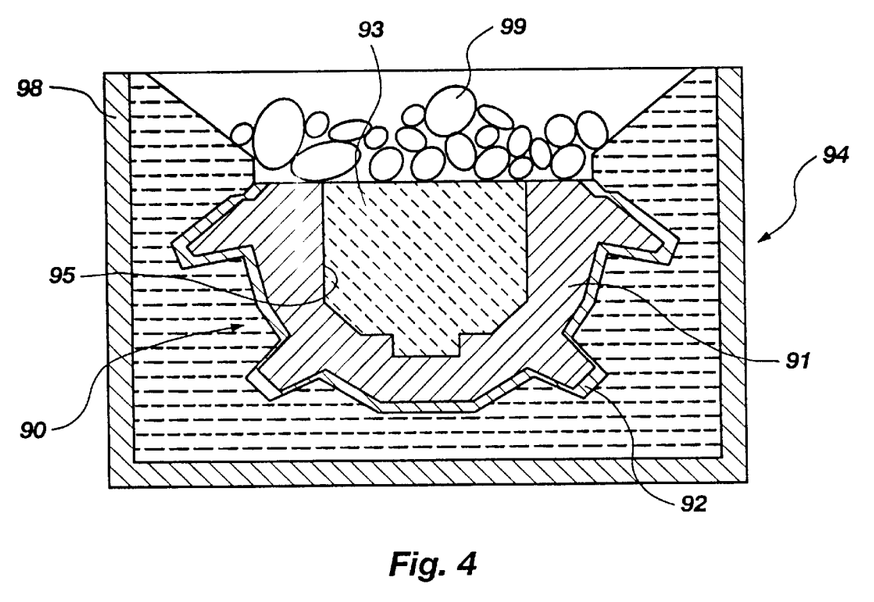
FIG. 4 is a cross-sectional view of a roller cone mold containing a roller cone manufactured in accordance with the present invention.

Those skilled in the art will appreciate the applicability of the method of manufacturing of the present invention for other types of drill bits, such as roller cone bits, coring bits, reamers and near-bit stabilizers, and various bit components. For example, as depicted in FIG. 4, a roller cone 90 for use on a roller cone bit, as is known in the art, may be manufactured according to the present invention. Similar to the formation of the drill bit 10, the roller cone 90 has a sintered steel powder core 91 and an exterior layer 92 of abrasion-resistant material such as tungsten carbide. The mold 94 may include a casing 98 containing packed sand or other materials that can be relatively easily removed, as by breaking, from around the finished roller cone 90. A displacement 93 may be included into the core 91 to form the interior surface 95 of the roller cone 90 and provided with various bearing surfaces so that the finished roller cone 90 can be attached to a bearing assembly on a roller cone attachment arm of a roller cone bit, as is known in the art. Binder 99 is employed to infiltrate core 91 and exterior layer 92.

Those skilled in the art will also appreciate that various mold configurations and materials can be used without departing from the scope of this invention and more particularly to the scope of the appended claims. For example, the mold 102 of FIG. 2C may include the casing 106 of FIG. 3B, the mold 120 comprised of graphite, ceramic, sand, clay, paper, silicon carbide, cuttle fish, tufa and other suitable materials known in the art that can withstand the high temperatures encountered during the infiltration process.

In exemplary embodiments, the mold is configured to produce a typical rotary-type "drag" bit. Those skilled in the art, however, will appreciate that the size, shape, and/or configuration of the bit may vary according to operational design parameters without departing from the spirit of the present invention. Further, the invention may be practiced on non-rotary drill bits, the invention having applicability to any drilling-related structure including percussion, impact or "hammer" bits. Moreover, although this invention has been described with respect to steel core bits with WC facing, those skilled in the art will appreciate this invention's applicability to drill bits manufactured from other metals and alloys thereof, and other suitable materials. Moreover, those skilled in the art will appreciate that references to the use of steel or other metallic powders as used in the claims in conjunction with this manufacturing process could include powders of various mesh sizes, up to and including shot-sized particles, although powders are believed to provide superior infiltration. It will also be appreciated by one of ordinary skill in the art that one or more features of any of the illustrated embodiments may be combined with one or more features from another to form yet another combination within the scope of the invention as described and claimed herein. Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of manufacturing a drilling-related structure for drilling a subterranean formation, comprising:
   providing a first mold having a cavity configured to define a finished drilling-related structure;
   inserting a core metal in particulate form into said first mold cavity;
   sintering said core metal until said core metal shrinks a desired amount to form a sintered, shrunken blank;
   introducing a particulate abrasion-resistant material into said first mold cavity around at least a portion of said sintered, shrunken blank; and
   infiltrating said sintered, shrunken blank and said particulate abrasion-resistant material with a binder.

2. The method of claim 1, further including inserting at least one displacement at least partially into said first mold cavity prior to sintering said core metal.

3. The method of claim 2, wherein said inserting said at least one displacement includes inserting at least one machinable part into said first mold cavity before sintering said core metal.

4. The method of claim 1, wherein said core metal is selected from the group comprising ferrous metals, non-ferrous metals, and alloys and combinations thereof.

5. The method of claim 1, further including providing a bonding resin in said first mold cavity with said core metal.

6. The method of claim 1, further including conducting said sintering at about 950° C. for about 30 minutes.

7. The method of claim 1, further including sintering said core metal in a substantially oxygen-free environment.

8. The method of claim 7, further including providing at least a partial vacuum in said first mold cavity to remove oxygen therefrom and replacing said oxygen in said first mold cavity with an inert gas.

9. The method of claim 7, further including providing said oxygen-free environment by introducing a gas selected from the group comprising hydrogen, argon, and nitrogen into said first mold cavity.

10. The method of claim 1, further including compacting said particulate core metal in said first mold cavity before sintering.

11. The method of claim 1, further comprising selecting said core metal from the group consisting essentially of particulate metals having relatively large mesh sizes, particulate metals having substantially uniform mesh sizes, particulate metals coated with a dissipative material, and particulate metals intermixed with a dissipative material.

12. The method of claim 1, further including removing said blank from said first mold cavity, working at least a portion thereof to remove material therefrom, and replacing said sintered, shrunken blank in said first mold cavity prior to said introducing said particulate abrasion-resistant material thereinto.

13. The method of claim 1, further including performing said infiltrating at approximately 1180° C.

14. The method of claim 1, further including selecting said binder from the group comprising copper, nickel, tin, and alloys and combinations thereof.

15. The method of claim 1, further including selecting tungsten carbide for said particulate abrasion-resistant material.

16. The method of claim 1, further including compacting said particulate abrasion-resistant material around said blank in a space between said blank and an inside surface of said first mold.

17. The method of claim 16, further including providing displacements within said first mold cavity prior to introducing said particulate abrasion- resistant material.

18. The method of claim 17, further including substantially coating at least some of said displacements with an abrasion-resistant material.

19. The method of claim 18, further including coating said at least some displacements with a binding material to hold said abrasion-resistant material thereon.

20. The method of claim 19, further including selecting said binding material from the group comprising a wax-like substance, a flexible polymeric binder, and an adhesive.

21. The method of claim 1, wherein said desired amount is approximately ¼ inch across a diameter of said drilling-related structure.

22. The method of claim 20, further including providing a tungsten carbide powder as said abrasion-resistant material.

23. A method of manufacturing a drilling-related structure for drilling a subterranean formation, comprising:
    forming a first mold having a cavity configured to define a blank for said drilling-related structure by:
        providing a second mold having a cavity configured to define said drilling-related structure;
        lining said second mold cavity of said second mold with a lining material to a thickness substantially equal to a desired thickness of a layer of abrasion-resistant material around said blank;
        forming a male part within said lined second mold cavity;
        removing said formed male part from said lined second mold cavity; and
        forming said first mold around said male part to define said first mold cavity;
    inserting a core metal in particulate form into said first mold cavity; and
    sintering said core metal to form said blank.

24. A method of manufacturing a rotary-type drill bit element for drilling subterranean formations, comprising:
    providing a bit mold defining a cavity;
    substantially filling said bit mold cavity with powdered steel;
    exposing said bit mold to a heat source to at least partially sinter said powdered steel into a porous bit blank;
    removing said bit blank from said mold cavity;
    substantially sintering said bit blank to form a shrunken sintered bit core of at least one smaller external dimension than said mold cavity;
    placing said shrunken, sintered bit core abutted by a steel displacement back into said mold cavity; and
    loading said mold cavity with tungsten carbide powder in a space created between an inside surface of said mold cavity and said shrunken bit core.

25. The method of claim 24, further including positioning at least one additional displacement within said mold cavity prior to said substantially filling.

26. The method of claim 25, further comprising at least partially coating said at least one additional displacement with tungsten carbide.

27. The method of claim 25, further including applying a binding material to said at least one additional displacement to hold tungsten carbide thereon.

28. The method of claim 24, further including shaping a surface of said bit blank to remedy out-of-tolerance portions thereon.

29. The method of claim 24, further including infiltrating said shrunken bit core and said tungsten carbide powder with a binder and bonding said steel displacement to said shrunken bit core with said infiltrating binder.

30. The method of claim 29, further including s electing said infiltrating binder from the group comprising copper, tin, nickel, and combinations thereof.

31. The method of claim 29, further including forming a threaded pin connection onto said steel displacement after said infiltrating.

32. A method of manufacturing a drilling-related structure used in drilling subterranean formations, comprising:
    forming a steel powder body;
    forming a mold around said steel powder body;
    removing said steel powder body from said mold;
    sintering and shrinking said steel powder body;
    placing said shrunken sintered body back into said mold;
    loading said mold with a carbide powder between said mod and said shrunken sintered body;
    providing a binder for said shrunken sintered body; and
    heating said mold until said binder liquifies and substantially infiltrates said shrunken sintered body and carbide powder.

33. The method of claim 32, including manufacturing said steel powder body using a layered manufacturing process.

34. The method of claim 32, further including forming said mold of a material selected from the group comprising ceramic, graphite, sand, clay, paper, silicon carbide, cuttle fish, and tufa.

35. A method of manufacturing a drilling-related structure for drilling a subterranean formation, comprising:
    forming a shell of abrasion-resistant material;
    inserting a preformed, sintered blank into said shell; and
    infiltrating said shell and said preformed, sintered blank with a binder.

36. The method of claim 35, wherein said shell is formed by a method of layered-manufacturing.

37. The method of claim 36, wherein said shell is formed by sintering a layer of abrasion-resistant material into a substantially self supporting structure.

* * * * *

UNITED STATES PATENT AND TRADEMARK OFFICE
CERTIFICATE OF CORRECTION

PATENT NO. : 6,073,518
DATED : June 13, 2000
INVENTOR(S) : Chow et al.

It is certified that error appears in the above-identified patent and that said Letters Patent is hereby corrected as shown below:

Title page,
After the first entry of "U.S. PATENT DOCUMENTS" insert -- 2,633,628  4/1953  Bartlett, 2,700,209  1/1955  Haller --; after the 6th entry insert -- 4,365,679  12/1982  van Nederveen et al. --; after the 7th entry insert -- 4,456,577  6/1984  Kawakita et al. --; after the 8th entry insert -- 4,780,274  10/1988  Barr --; after the 9th entry insert -- 4,871,621  10/1989  Bagley et al. --;

OTHER PUBLICATIONS, line 5, change "Reproduction" to -- Production --; and after last entry, insert -- PCT Search Report, March 5, 1998, Column 1,
Line 62, after "and" delete ",";

Column 7,
Line 15, after "WC" insert -- shell --;
Line 35, after "displacements" (first occurrence) insert -- , --;
Line 41, change "proper by" to -- properly --;

Column 8,
Line 33, after "resistant" insert -- WC --;

Column 9,
Line 2, before "layer" insert -- WC --;
Line 62, before "material" insert -- WC --;

Column 10,
Line 52, change "120" to -- 121 --; and

Column 11,
Line 43, change "102" to -- 120 --.

Column 12, claim 12,
Line 58, after "said" (first occurrence) before "blank" insert -- sintered, shrunken --;

Column 13, claim 16,
Line 5, after "said" (second occurrence) before "blank" insert -- sintered, shrunken --;
Line 6, after "said" (first occurrence) before "blank" insert -- sintered, shrunken --;
Line 7, after "mold" and before "." insert -- cavity --;

UNITED STATES PATENT AND TRADEMARK OFFICE
CERTIFICATE OF CORRECTION

PATENT NO.    : 6,073,518
DATED         : June 13, 2000
INVENTOR(S)   : Chow et al.

It is certified that error appears in the above-identified patent and that said Letters Patent is hereby corrected as shown below:

Column 13, claim 17,
Line 10, change "abrasion -resistant" to -- abrasion-resistant --;

Column 14, claim 24,
Line 3, after "shrunken" insert -- sintered --;

Column 14, claim 29,
Lines 17 and 19, after "shrunken" insert -- sintered --;

Column 14, claim 30,
Line 20, change "s electing" to -- selecting --; and

Column 14, claim 32,
Line 34, change "mod" to -- mold --.

Signed and Sealed this

Ninth Day of April, 2002

*Attest:*

*Attesting Officer*

JAMES E. ROGAN
*Director of the United States Patent and Trademark Office*